United States Patent [19]

Streets et al.

[11] 4,204,987

[45] May 27, 1980

[54] AQUEOUS POLYESTER DISPERSION FOR ADHERING VINYL FILM TO WOOD

[75] Inventors: Roger L. Streets, Mansfield; Thomas G. Rabito, Ashland; John Von Kamp, New London, all of Ohio

[73] Assignee: The Goodyear Tire & Rubber Company, Akron, Ohio

[21] Appl. No.: 627,722

[22] Filed: Oct. 31, 1975

[51] Int. Cl.$^2$ .......................... C08L 67/02; C08J 5/12
[52] U.S. Cl. .............................. 260/29.2 E; 428/458; 428/480; 428/481; 428/483; 528/309
[58] Field of Search ................................... 260/29.2 E

[56] References Cited

U.S. PATENT DOCUMENTS

| | | | |
|---|---|---|---|
| 2,334,107 | 11/1943 | Light et al. | 260/29.2 E |
| 2,378,230 | 1/1945 | Little | 260/29.2 E |
| 2,562,878 | 8/1951 | Blair | 260/29.2 E |
| 3,115,476 | 12/1963 | Agens et al. | 260/29.2 E |
| 3,182,041 | 5/1965 | Watkins et al. | 260/29.2 E |
| 3,415,788 | 12/1968 | Jedlicka | 260/29.2 E |
| 3,746,681 | 7/1973 | McClain | 260/29.2 E |

*Primary Examiner*—Paul Lieberman
*Assistant Examiner*—A. Koeckert
*Attorney, Agent, or Firm*—J. D. Wolfe

[57] ABSTRACT

A polyester adhesive suitable for adhering vinyl films and related materials to wood and metal, the adhesive comprising a water dispersion of a polyester of 10,000 to 30,000 molecular weight range with a carrier and emulsifier.

4 Claims, No Drawings

AQUEOUS POLYESTER DISPERSION FOR ADHERING VINYL FILM TO WOOD

This invention relates to a polyester based adhesive. More particularly, this invention relates to a water dispersion of a polyester based adhesive suitable for laminating plastic such as vinyl polymers or resins to wood or metal.

It has been desirable to adhere vinyl resin parts or films to wood to protect the wood and also to give the wood certain desirable aesthetic effects, as vinyl film can have printed thereon any design effect. Unfortunately, difficulty has been experienced in obtaining ready adhesion between plastics such as vinyl parts and the wood and also the adhesives useful for adhering vinyl to wood or metal.

The adhesive of this invention comprises a fluid blend of 100 parts of a saturated polyester composed of the condensation product of an organic dicarboxylic acid or anhydride with a glycol to obtain a molecular weight of 10,000 to 30,000 with the preferred range being 15,000 to 26,000, dispersed in about 50 to 160 parts by weight of water in the presence of 80 to 125 parts by weight of a carrier and a stabilizing amount of an emulsifier. The fluidity of the above dispersion is primarily a function of particle size of the dispersed polyester phase. Usually 30 to 55 percent by weight of solid phase is desired for shipping and storage but the adhesive should be dilute enough to be readily applied by painting.

The nature of this invention more readily may be seen and understood along with its advantages by reference to the following example, wherein all parts and percentages are by weight.

EXAMPLE

A 100 parts of a polyester produced by condensing 50 parts ethylene glycol, 50 parts neopentyl glycol with sufficient terephthalic acid to obtain a condensate having a molecular weight of 20,000 was mixed with 82 parts of 85/15 percent by weight blend of benzene and ethanol to give a stirrable mass. To this mass was added preferably or optionally four parts of a defoamer of silicone type to reduce tendency to foam, 2.5 parts oleic acid and 2.5 parts of a commercial grade of diethanol amine, with stirring. Then water was added slowly to the stirred mass until the mass converts from a water in oil dispersion to an oil in water one. Usually about 50 to 160 parts of water is added during this conversion. Preferably, a nonionic stabilizer such as octyl phenoxyethanol 2.0 parts, is stirred into the mass to stabilize the dispersion. It is preferred that the dispersion have preferably an average particle size of one to five microns and preferably a solid content of 30 to 55 percent by weight.

This emulsion has excellent storage life and can be painted or spread on a substrate to the depth of one to five mils and dried at 120° C. for one to three minutes before being placed in laminating relationship with another specimen. Then the laminated specimens preferably are heated to set the adhesive at 125° to 170° C. where the laminate is a six mil vinyl film/particle board; or Mylar film/Mylar film or vinyl film/Kraft paper, the laminate failed in the tear test in the vinyl film, the Mylar film and the paper rather than in the adhesive layer. Thus, this polyester-based adhesive is satisfactory for bonding plastic, cellulosic materials and metals together.

Representative of the many copolyesters usable in the above examples are those containing units from ethylene glycol and units from neopentyl glycol in the ratio of 56/44 and units from terephthalic acid and sebacic acid in the ratio of 71/29.

The foregoing example illustrates the invention with respect to a use of a specific copolyester, but polyesters of sebacic acid, terephthalic acid, ethylene glycol and neopentyl glycol could be used in that example to illustrate resins of a varied range of compositions that can be used. For example, the ethylene glycol units can range from 40 to 60 percent of the total glycol units, the neopentyl glycol units can range from 60 to 40 percent of the total, the terephthalic acid units can range from 20 to 75 percent of the total acid units and the sebacic acid units can range from 80 to 25 percent of the total acid units.

Other copolyester resins can be used in place of the ethylene glycol-neopentyl glycol-terephthalate sebacate copolyester used in the example. Representative examples of such copolyesters are ethylene-neopentyl terephthalate isophthalate isophthalate copolyesters in which the ratio of ethylene glycol units to neopentyl glycol units is in the range of 40/60 to 60/40 and the terephthalic acid units and isophthalic acid units in the copolyester are present in the range of 95/5 to 50/50 and the tetramethylene-terephthalate isophthalate sebacate copolyesters in which the units of the acids are present in the range of 20 to 50 of terephthalic units to =to 50 of isophthalic units and 50 to 20 percent of sebacic units.

The emulsifiers useful in this invention are those useful for making oil in water emulsions. The reaction product of the fatty acids or fats with amines such as alcohol amines, for example, ethanol amine or diethanol amine are satisfactory for this purpose. Usually sufficient emulsifying agent is used to give the emulsion satisfactory shelf life and generally they are used in about 0.5 to 10 percent with the preferred range being one to six percent.

The carrier can be any low boiling solvent for the polyester. Usually, the carrier has the ability to render the polyester stirrable at 20°–25° C. and blends of aromatic solvents such as benzene or toluene with the lower alcohols such as ethanol, propanol and butanol and the lower boiling aliphatic chlorinated hydrocarbon such as methylene chloride can be used to advantage for this purpose.

Carrier solvents made by blending toluene, 85 to 90 percent, with 15 to 10 percent of an alkanol, or toluene/lower ketone/methyl chloride 10/40/10 are well suited for this purpose. Benzene can be used in place of toluene excent its vapors generally are objectionable in adhesives.

While certain representative embodiments and details have been shown for the purpose of illustrating the invention, it will be apparent to those skilled in this art that various changes and modifications may be made therein without departing from the spirit or scope of the inventin.

What is claimed is:

1. An adhesive composition capable of adhering a vinyl film to wood, consisting of a mixture of 100 parts by weight of saturated polyester of an organic dicarboxylic acid or its anhydride with a glycol and 80 to 125 parts by weight of a carrier, 50 to 160 parts by weight of water and an emulsifying agent, said mixture being mixed to give an oil in water dispersion of 30 to 55 percent solids, said polyester having a molecular weight of 10,000 to 30,000.

2. The adhesive composition of claim 1 wherein the carrier is selected from a blend consisting of toluene-ethanol, toluene-propanol, toluene-butanol and toluene-methyl ethyl ketone-methylene chloride.

3. The adhesive composition of claim 1 wherein the polyester is the condensation product of a glyol and a phthalic acid or anhydride, the carrier is selected from blends consisting of toluene-ethanol, toluene-propanol, toluene-butanol and toluene-methyl ethyl ketone-methylene chloride.

4. The adhesive composition of claim 1 wherein the polyester is a copolyester of ethylene glycol, neopentyl glycol and terephthalic acid.

* * * * *